(12) United States Patent
Yi et al.

(10) Patent No.: US 10,762,057 B2
(45) Date of Patent: Sep. 1, 2020

(54) METHOD AND SYSTEM FOR SHARING FILE BETWEEN DEVICES

(71) Applicant: NHN Entertainment Corporation, Seongnam-si (KR)

(72) Inventors: Eunsung Yi, Seongnam-si (KR); Jihoon Jo, Seongnam-si (KR); Yonghee Lee, Seongnam-si (KR); Nam Jug Kim, Seongnam-si (KR); Nam Kyung Kim, Seongnam-si (KR); Jiyoon Bang, Seongnam-si (KR); Beom Seok Jang, Seongnam-si (KR); HongSeok Choi, Seongnam-si (KR); DongWoo Kim, Seongnam-si (KR); MinKyu Lee, Seongnam-si (KR); Yeonseong Chae, Seongnam-si (KR); Yong Seok Hong, Seongnam-si (KR); CheolHyeon Jo, Seongnam-si (KR); JiHae Kim, Seongnam-si (KR); Jinwoo Kim, Seongnam-si (KR); Min Hyeong Kim, Seongnam-si (KR); Jin Kyung Lyu, Seongnam-si (KR); SeYoung Jang, Seongnam-si (KR); YunJung Woo, Seongnam-si (KR); Eunsook Jin, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 120 days.

(21) Appl. No.: 15/835,826

(22) Filed: Dec. 8, 2017

(65) Prior Publication Data

US 2018/0167451 A1 Jun. 14, 2018

(30) Foreign Application Priority Data

Dec. 9, 2016 (KR) .......................... 10-2016-0167580
Dec. 9, 2016 (KR) .......................... 10-2016-0167582

(51) Int. Cl.
*H04L 29/08* (2006.01)
*G06F 9/44* (2018.01)
(Continued)

(52) U.S. Cl.
CPC .......... *G06F 16/1827* (2019.01); *G06F 9/451* (2018.02); *G06F 16/11* (2019.01);
(Continued)

(58) Field of Classification Search
CPC .... G06F 16/1827; G06F 16/176; G06F 16/11; G06F 9/451; G06F 16/9027; G06F 3/067;
(Continued)

(56) References Cited

U.S. PATENT DOCUMENTS 8,762,480 B2 6/2014 Park et al.
8,935,322 B1 1/2015 Grosz et al.
(Continued)

FOREIGN PATENT DOCUMENTS

JP 2005-316523 11/2005
JP 2008-217695 9/2008
(Continued)

OTHER PUBLICATIONS

Utilizing FTP Function of iptime NAS with NetDrive (Jul. 5, 2014), http://pageview.tistory.com/510.
(Continued)

*Primary Examiner* — Soe Hlaing
(74) *Attorney, Agent, or Firm* — H.C. Park & Associates, PLC

(57) ABSTRACT

A method for sharing file of a first electronic device used by a user using a share message implemented by a computer may include: uploading a file to be shared with a second electronic device used by the user to a server according to the share message transmitted through a chat session set between an account of the user of the first electronic device
(Continued)

and the server providing a cloud service; storing the share message including a link of a storage location of the server for the file uploaded to the server as an instance message of a private chat room corresponding to the chat session; and displaying the share message stored as the instance message through the private chat room on a screen of the first electronic device, wherein the second electronic device may be configured to access the private chat room with the account of the user.

19 Claims, 19 Drawing Sheets

(51) Int. Cl.
*H04L 12/18* (2006.01)
*H04L 12/58* (2006.01)
*H04L 29/06* (2006.01)
*G06F 16/182* (2019.01)
*G06K 9/00* (2006.01)
*G06F 16/11* (2019.01)
*G06F 16/176* (2019.01)
*G06K 9/62* (2006.01)
*G06F 9/451* (2018.01)
*G06F 3/06* (2006.01)
*G06F 16/901* (2019.01)

(52) U.S. Cl.
CPC ....... *G06F 16/176* (2019.01); *G06K 9/00087* (2013.01); *G06K 9/6201* (2013.01); *H04L 12/1813* (2013.01); *H04L 51/04* (2013.01); *H04L 65/1069* (2013.01); *H04L 67/06* (2013.01); *H04L 67/104* (2013.01); *H04L 67/1097* (2013.01); *G06F 3/0605* (2013.01); *G06F 3/067* (2013.01); *G06F 3/0608* (2013.01); *G06F 16/9027* (2019.01); *H04L 51/24* (2013.01)

(58) Field of Classification Search
CPC ... G06F 3/0608; G06F 3/0605; G06K 9/6201; G06K 9/00087; H04L 51/04; H04L 12/1813; H04L 67/104; H04L 67/06; H04L 65/1069; H04L 67/1097; H04L 51/24

See application file for complete search history.

(56) References Cited

U.S. PATENT DOCUMENTS

| 9,912,652 | B2 | 3/2018 | Hirakata et al. |
| 2005/0114305 | A1* | 5/2005 | Haynes ................. G06F 3/0481 |
| 2007/0162605 | A1* | 7/2007 | Chalasani ............... H04L 51/04 709/227 |
| 2007/0185967 | A1* | 8/2007 | Hayes, Jr. ............ G06Q 10/107 709/208 |
| 2013/0198304 | A1* | 8/2013 | Jung .................. H04L 12/1818 709/206 |
| 2014/0282938 | A1 | 9/2014 | Moisa |
| 2014/0365655 | A1 | 12/2014 | Takahashi et al. |
| 2015/0200945 | A1 | 7/2015 | Edson |
| 2016/0085768 | A1 | 3/2016 | Hashimoto |
| 2016/0119257 | A1* | 4/2016 | Yun ........................ H04L 51/02 709/206 |
| 2016/0127347 | A1 | 5/2016 | Childs et al. |
| 2016/0294570 | A1 | 10/2016 | Ahi |
| 2017/0212691 | A1 | 7/2017 | Katsuki |

FOREIGN PATENT DOCUMENTS

| JP | 2009-169507 | 7/2009 |
| JP | 2014-238786 | 12/2014 |
| JP | 2014-238824 | 12/2014 |
| JP | 2015-210567 | 11/2015 |
| JP | 2016-066193 | 4/2016 |
| JP | 2016-091547 | 5/2016 |
| JP | 2016-194739 | 11/2016 |
| KR | 10-1295209 | 9/2013 |
| KR | 10-2015-0049242 | 5/2015 |
| KR | 10-2015-0067643 | 6/2015 |
| KR | 10-2016-0049387 | 5/2016 |
| KR | 10-1626117 | 5/2016 |
| KR | 10-2016-0091861 | 8/2016 |
| KR | 10-2016-0118499 | 10/2016 |

OTHER PUBLICATIONS

Japanese Office Action dated Jun. 11, 2019 in Japanese Patent Application No. 2017-224860.
Korean Office Action dated Jul. 16, 2018, issued in Korean Patent Application No. 10-2016-0167580.
Non-Final Office Action dated Jul. 11, 2019 in the U.S. Appl. No. 15/835,775.
Final Office Action issued in the U.S. Appl. No. 15/835,775 dated Jan. 24, 2020.
Notice of Allowance dated Jul. 15, 2020 issued to U.S. Appl. No. 15/835,775.

* cited by examiner

212

FIG. 11
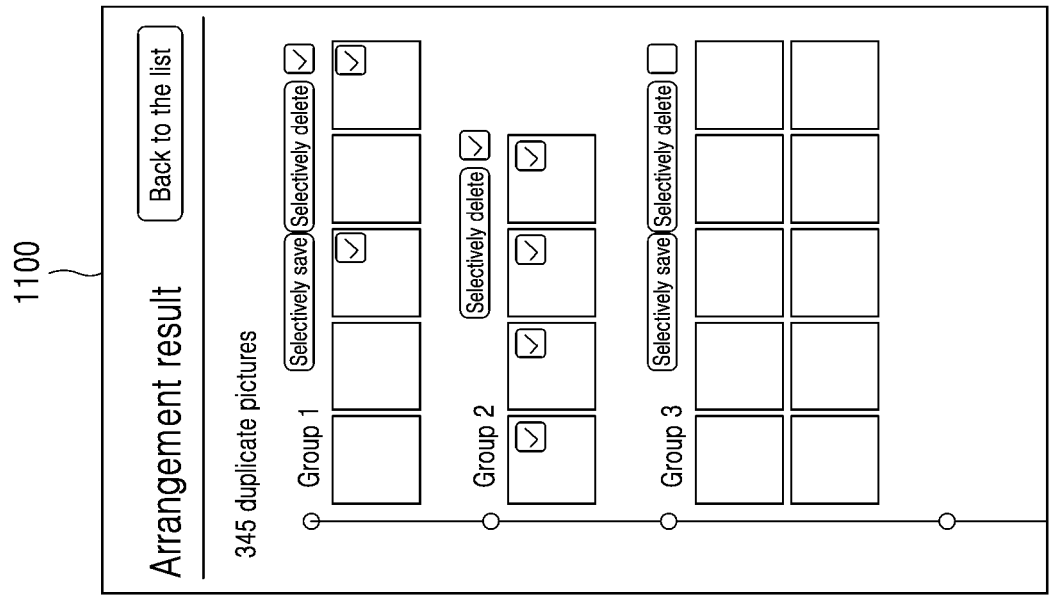
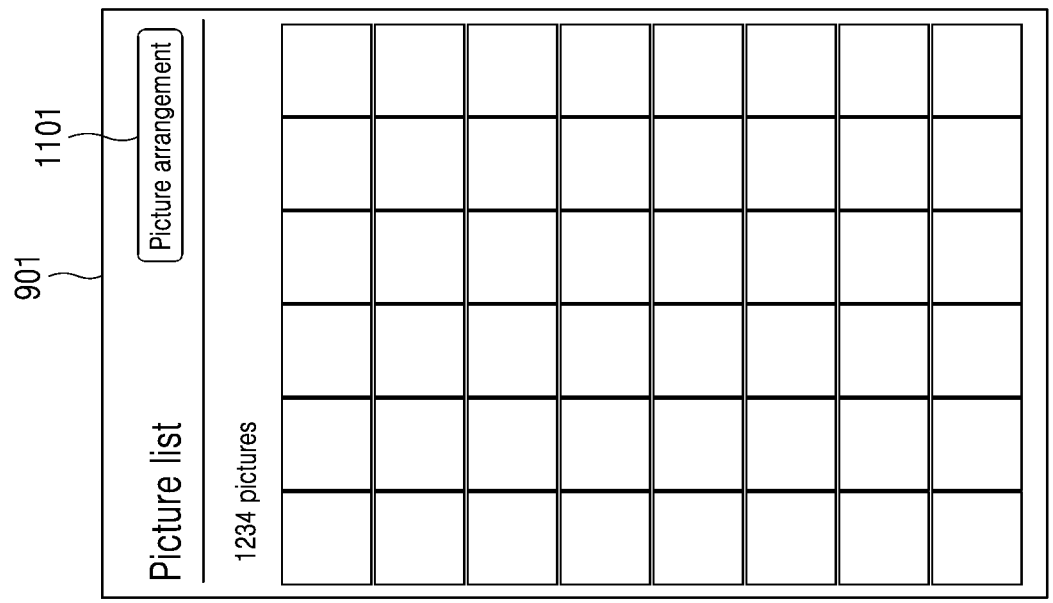

FIG. 12

FIG. 19
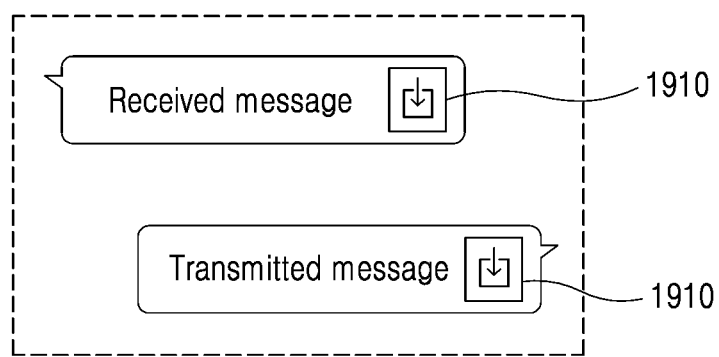
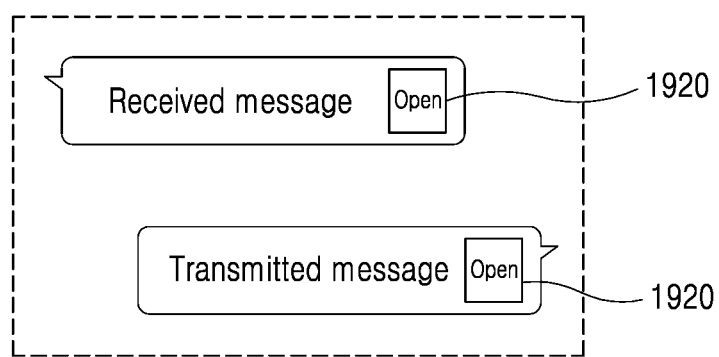

METHOD AND SYSTEM FOR SHARING FILE BETWEEN DEVICES

CROSS-REFERENCE TO RELATED APPLICATION

This application claims the priority from and the benefit of Korean Patent Application No. 10-2016-0167580, filed on Dec. 9, 2016, and Korean Patent Application No. 10-2016-0167582, filed on Dec. 9, 2016, which are hereby incorporated by reference for all purposes as if set forth herein.

BACKGROUND

Field

The following exemplary embodiments relate to a technology for sharing files between devices.

Discussion of the Background

As network technology has developed, data stored on a device (e.g. a desktop, a laptop, a portable device, and the like) used by a user has been stored on cloud storage on the Internet. The user may then access and use the data stored on the cloud storage anywhere and anytime.

As an example, Korean Patent Application No. 10-2015-0067643 (published on Jun. 18, 2015) discloses a method and apparatus for sharing file in cloud storage service.

The above information disclosed in this Background section is only for understanding of the background of the inventive concepts, and, therefore, it may contain information that does not constitute prior art.

SUMMARY

At least one exemplary embodiment provides a method and system for providing a meta service for integrally managing a plurality of cloud storages.

At least one exemplary embodiment provides a method and system for integrally managing a device that a user uses with cloud storage.

At least one exemplary embodiment provides a method and system for supporting sharing a file between devices through a chat format user interface (UI).

According to at least one exemplary embodiment, a method for sharing a file of a first electronic device used by a user using a share message implemented by a computer may include: uploading a file to be shared with a second electronic device used by the user to a server according to the share message transmitted through a chat session set between an account of the user of the first electronic device and the server providing a cloud service; storing the share message including a link of a storage location of the server for the file uploaded to the server as an instance message of a private chat room corresponding to the chat session; and displaying the share message stored as the instance message through the private chat room on a screen of the first electronic device, wherein the second electronic device may be configured to: access the private chat room with the account of the user; and share the file uploaded on the server through the share message displayed in the private chat room.

The second electronic device may be configured to download the file from the server through the link included in the share message.

The method may include providing receipt notification of a share message for a corresponding file on a screen for the second electronic device in response to the first electronic device uploading the file to be shared with the second electronic device to the server.

The storing of the share message may include storing a share message as a separate chat message for each file uploaded to the server.

The storing of the share message may include storing a share message including type information of a corresponding file for each file uploaded to the server.

The storing of the share message may include storing a share message including information for a corresponding device when the device to share the file is specified.

The displaying of the share message may include displaying a share message by filtering by devices through the private chat room.

The displaying of the share message may include providing a user interface (UI) displayed through the private chat room for downloading a file for each share message of the file that is not downloaded, and providing a UI displayed through the private chat room for opening a file for each share message of the file that is downloaded.

The method may further include providing a file storage box for managing a file list shared between the electronic device and the device through the private chat room.

The providing of a file storage box may further include displaying the file list by filtering by file types.

The providing of a file storage box may further include: providing a UI for downloading a file for the file in the file list that is not downloaded; and providing a UI for opening a file for the file that is downloaded.

According to at least one exemplary embodiment, a computer program recorded in a computer-readable medium may execute a method for sharing file of a first electronic device used by a user using a share message combined with a system for sharing the file implemented by a computer, the method including: uploading a file to be shared with a second electronic device used by the user to a server according to the share message transmitted through a chat session set between an account of the user of the first electronic device and the server providing a cloud service; storing the share message including a link of a storage location of the server for the file uploaded to the server as an instance message of a private chat room corresponding to the chat session; and displaying the share message stored as the instance message on a screen of the first electronic device through the private chat room, wherein the second electronic device is configured to: access the private chat room with the account of the user; and share the file uploaded to the server through the share message displayed in the private chat room.

According to at least one exemplary embodiment, a system for sharing file of a first electronic device used by a user using a share message implemented by a computer, the system may include at least one processor implemented to execute computer-readable instructions, wherein the at least one processor may be configured to: upload the file to be shared with a second electronic device used by the user to a server according to the share message transmitted through a chat session set between an account of the user of the first electronic device and the server providing a cloud service; store the share message including a link of a storage location of the server for the file uploaded to the server as an instance message of a private chat room corresponding to the chat session; and display the share message stored as the instance message on a screen of the first electronic device through the private chat room.

The second electronic device may be configured to: access the private chat room with the account of the user; share the file uploaded to the server through the share message displayed on the private chat room, and download the file from the server through the link included in the share message.

The at least one processor may be configured to provide receipt notification of a share message for a corresponding file on a screen for the second electronic device in response to the first electronic device uploading the file to be shared with the second electronic device to the server.

The at least one processor may be configured to: store a share message as a separate chat message for each file uploaded on the server; and store the share message by including type information of the corresponding file.

The at least one processor may be configured to: store a share message as a separate chat message for each file uploaded on the server; and store the share message by including information for a corresponding device in response to specifying the second electronic device to which share file is shared.

The at least one processor may be configured to: provide a UI displayed through the private chat room for downloading a file that is not downloaded for each share message; and provide a UI for opening a file that is downloaded for each share message.

The at least one processor may be configured to provide a file storage box for managing a file list shared between the first electronic device and the second electronic device through the private chat room.

The at least one processor may be configured to: provide a UI for downloading a file for the file that is not downloaded in the file list; and provide a UI for opening a file for the file that is downloaded.

The foregoing general description and the following detailed description are exemplary and explanatory and are intended to provide further explanation of the claimed subject matter.

BRIEF DESCRIPTION OF THE DRAWINGS

These and/or other aspects, features, and advantages of the invention will become apparent and more readily appreciated from the following description of embodiments, taken in conjunction with the accompanying drawings.

Figure 12:
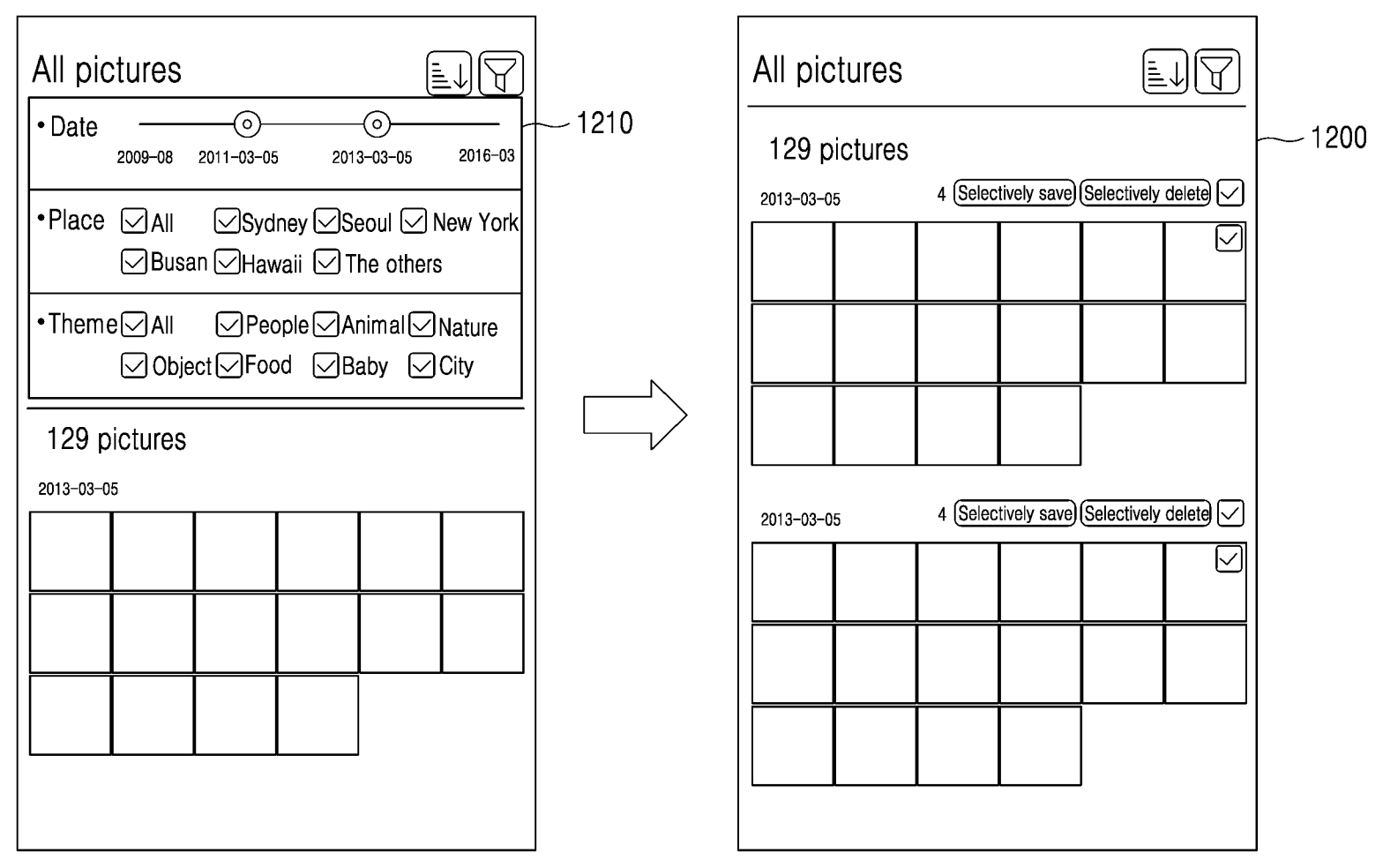

FIGS. 6, 7, 8, 9, 10, 11, and 12 illustrate an exemplary a cloud storage management screen according to an exemplary embodiment.

FIGS. 14, 15, 16, 17, 18, and 19 illustrate an exemplary private chat room for sharing file according to an exemplary embodiment.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

The exemplary embodiments of the invention relate to a technology for managing cloud storage, particularly, a technology that enables a meta service for a plurality of cloud storages may be provided and a file may be managed through a chat type of UI.

The exemplary embodiments, including things specifically disclosed in this specification, may integrally manage cloud storage, and through this, significant advantages may be achieved in terms of efficiency, convenience, cost saving, and the like.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, specific exemplary embodiments for a method and system for managing cloud storage will be described.

Figure 1:
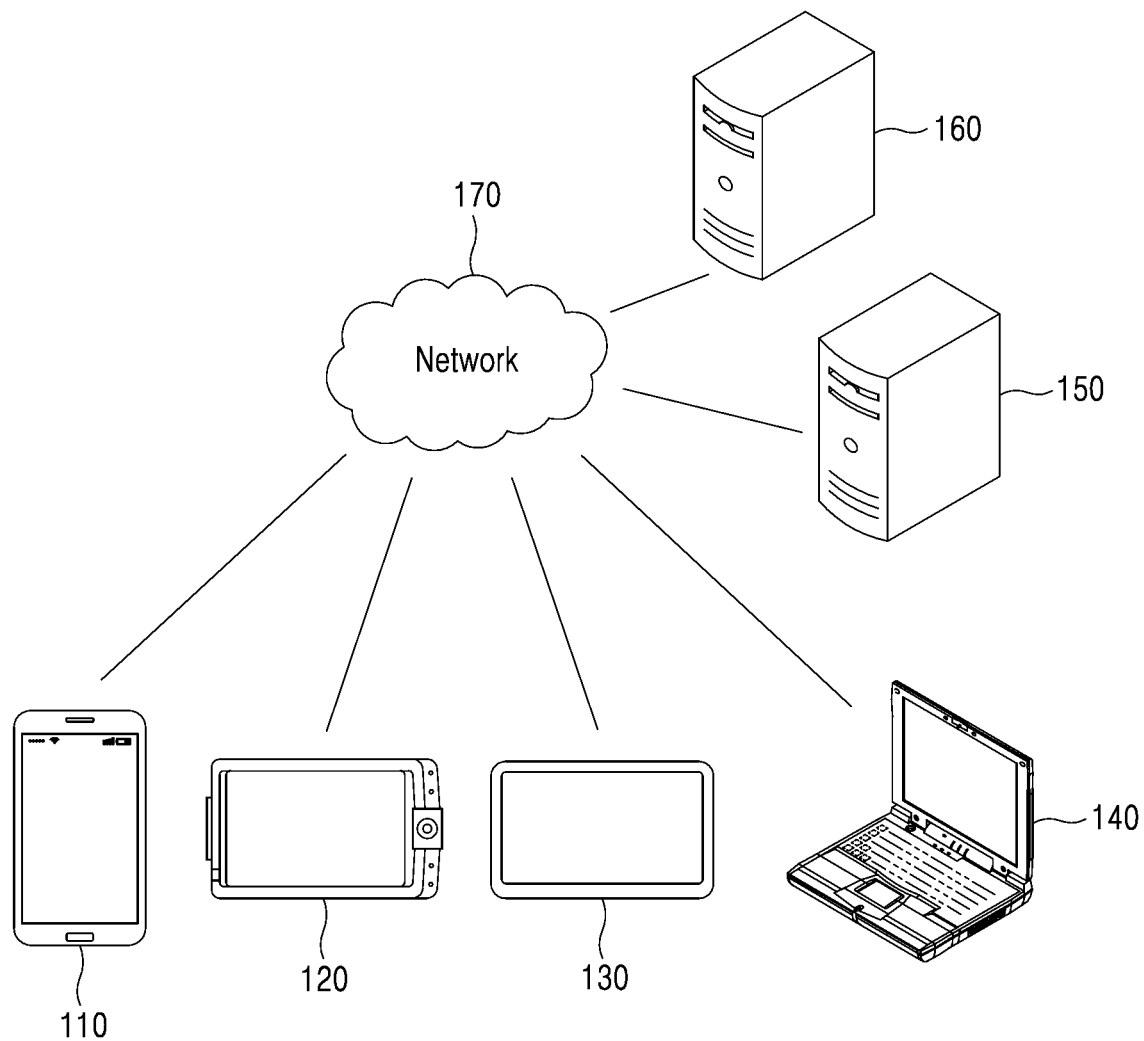
FIG. 1 illustrates an example of a network environment according to an exemplary embodiment.

FIG. 1 illustrates an exemplary network environment according to an exemplary embodiment. A network environment of FIG. 1 may include a plurality of electronic devices 110, 120, 130, and 140, a plurality of servers 150 and 160, and a network 170. However, FIG. 1 is an exemplary illustration for description purpose only, and the number of electronic devices and the number of servers are not limited thereto.

The plurality of electronic devices 110, 120, 130, and 140 may be fixed terminals implemented by a computer and portable terminals. For example, any of the plurality of electronic devices 110, 120, 130, and 140 may also be a smart phone, a mobile phone, a navigation, a computer, a laptop, a digital broadcasting terminal, a PDA (Personal Digital Assistants), a PMP (Portable Multimedia Player), a tablet PC, and the like. For example, the first electronic device 110 may communicate with other electronic devices 120, 130, and 140 and the servers 150 and 160 through the network 170 using a wireless and/or wired communication method.

The communication method is not limited to utilizing the communication network (e.g. mobile communication network, the wired Internet, the wireless Internet, and broadcasting network) included in the network 170, and may also include short-range wireless communication. For example, the network 170 may include any one or more network among networks of a PAN (personal area network), LAN (local area network), CAN (campus area network), MAN (metropolitan area network), WAN (wide area network), BBN (broadband network), the Internet, and the like. Also, the network 170 may include any one or more network topologies including a bus network, star network, ring network, mesh network, star-bus network, tree and/or hierarchical network, and the like, but it may not be limited thereto.

Each of the servers 150 and 160 may be implemented using a single or a plurality of computer devices providing an instruction, a code, a file, content, a service, and the like by communicating through the plurality of electronic devices 110, 120, 130, and 140 and the network 170.

For example, the server 160 may provide a file for installing an application to the first electronic device 110 accessed through the network 170. In this case, the first electronic device 110 may install an application by using the file provided from the server 160. Also, by controlling an Operating System (OS) and at least one program (e.g. browser or the installed application) installed on the first electronic device 110, the electronic device may access the server 150 and receive service and/or content that the server 150 provides. For example, when the first electronic device 110 transmits a service request message through the network 170 by controlling the application, the server 150 may transmit a code corresponding to the service request message to the first electronic device 110, and the first electronic device 110 may receive the code and provide the content to a user by displaying the content on the display screen by controlling the application.

Figure 2:
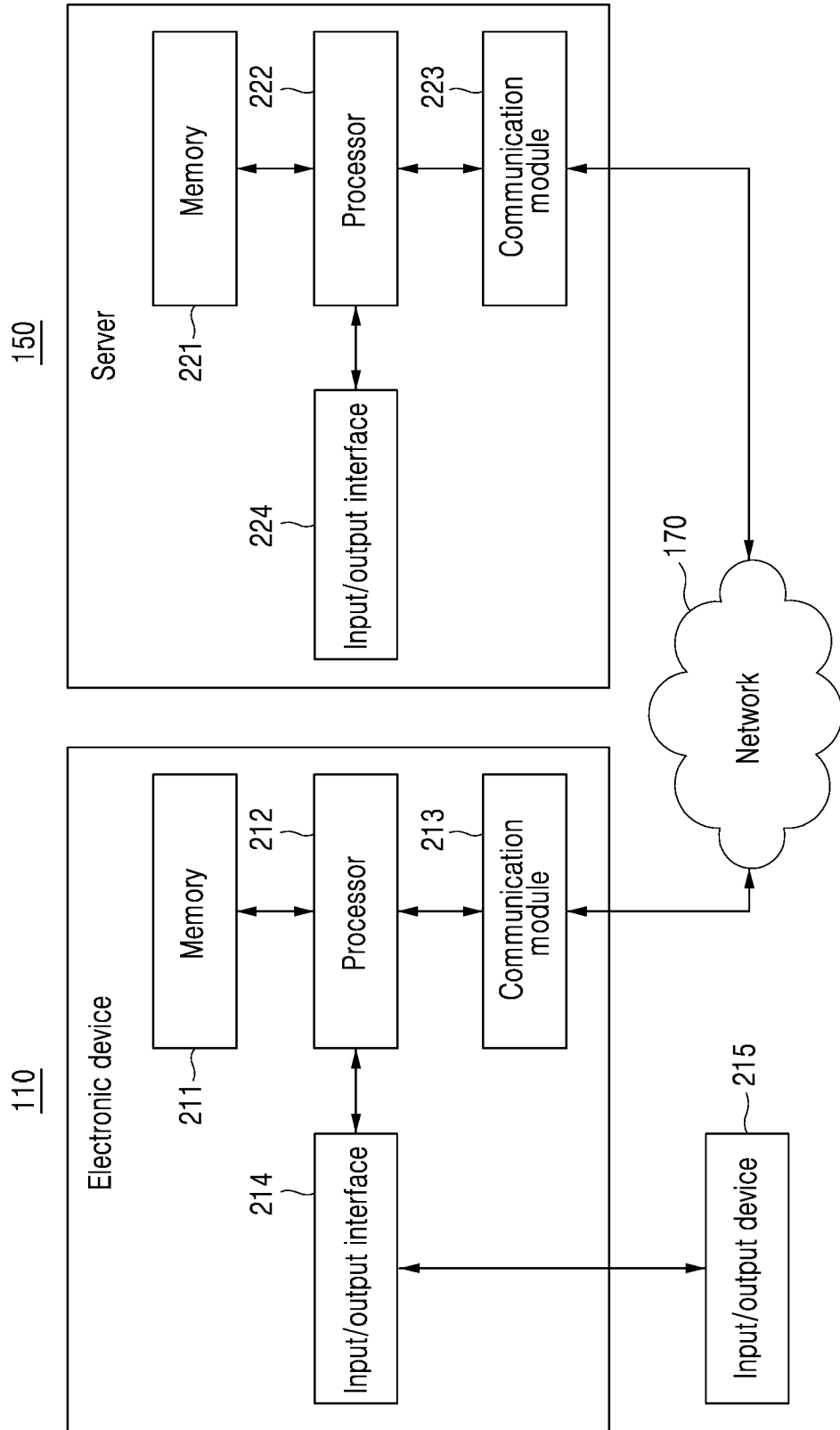
FIG. 2 is a block diagram illustrating an internal configuration of an electronic device and a server according to an exemplary embodiment.

FIG. 2 is a block diagram illustrating an exemplary internal configuration of an electronic device and a server according to an exemplary embodiment. FIG. 2 describes the internal configuration of the first electronic device 110 as an example of one electronic device and the server 150 as an example of one server. Other electronic devices 120, 130, and 140 and/or the server 160 may have substantially the same or similar internal configuration.

The first electronic device 110 and the server 150 may include memories 211 and 221, processors 212 and 222, communication modules 213 and 223, and input/output interfaces 214 and 224. The memories 211 and 221 may include computer readable recording medium including a permanent mass storage device such as RAM (random access memory), ROM (read only memory), and a disc drive. Also, the memories 211 and 221 may store OS (Operating System) and/or at least one program code (e.g. code for the application installed and executed on the electronic device and the like). The software components may be loaded from computer-readable recording medium other than the memories 211 and 221. The other computer-readable recording medium may include a floppy disc, a disc, a tape, a DVD/CD-ROM drive, a memory card, and the like. According to the exemplary embodiments, the software components may also be loaded to the memories 211 and 221 through the communication modules 213 and 223. For example, at least one program may be loaded to the memories 211 and 221 based on a program (e.g. the described application) which is installed using files received from developers and/or file distributing systems distributing application installation files (e.g. the described server 160) through the network 170.

The processors 212 and 222 may be configured to process instructions of computer program by performing basic arithmetic, logic, and input/output operation. The instructions may be provided to the processors 212 and 222 by the memories 211 and 221 and/or the communication modules 213 and 223. For example, the processors 212 and 222 may be configured to execute the instructions received in accordance using the program code stored in the recording device such as the memories 211 and 221.

The communication modules 213 and 223 may provide a function for communicating the first electronic device 110 and the server 150 through the network 170 and provide a function for communicating with other electronic devices (e.g. the second electronic device 120) and/or other servers (e.g. the server 160). For example, a request that the processor 212 of the first electronic device 110 generates according to a program code stored in recording device such as the memory 211 may be transmitted to the server 150 through the network 170 by controlling the communication module 213. According to the exemplary embodiments, a control signal and/or an instruction, content, a file, and the like which are provided by controlling the processor 222 of the server 150 may be transmitted to the first electronic device 110 through the communication module 213 of the first electronic device 110 through the communication module 223 and the network 170. For example, the server 150 may transmit the control signal and/or instruction, and the like through the communication module 213 to the processor 212 and/or the memory 211, and the content and/or file, and the like may be stored in the storage medium included in the first electronic device 110.

The input/output interface 214 may provide an interface between an input/output device 215 and the processor 212. For example, an input device may include a keyboard, a mouse, etc., and an output device may include a device such as a display for displaying a communication session of an application. According to the exemplary embodiments, the input/output interface 214 may be the interface of a device in which an input function and an output function are integrated into a single function such as a touch screen. For example, when processing instructions of the computer program loaded to the memory 211, the processor 212 of the first electronic device 110 may display a service screen and/or content generated by using the data provided by the server 150 and/or the second electronic device 120 on the display through the input/output interface 214.

Also, according to the exemplary embodiments, the first electronic device 110 and the server 150 may further include more components than the components of FIG. 2. However, there is no need to clearly illustrate most prior art components. For example, the first electronic device 110 may be implemented to include at least part of the described input/output device 215 or further include other components such as a transceiver, a GPS (Global Positioning System) module, a camera, various sensors, a database, and the like. As a more specific example, when the first electronic device 110 is a smart phone, it may be known that various components such as an acceleration sensor and/or gyro sensor, camera, various physical buttons, button using touch panel, input/output port, vibrator for vibrating, and the like that the smart phone usually includes may be implemented to be further included in the first electronic device 110.

Figure 3:
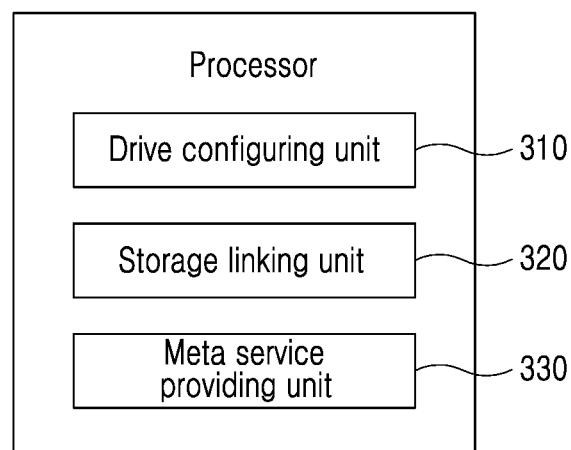
FIG. 3 is a block diagram illustrating an example of components that a processor of an electronic device may include according to an exemplary embodiment.
Figure 4:
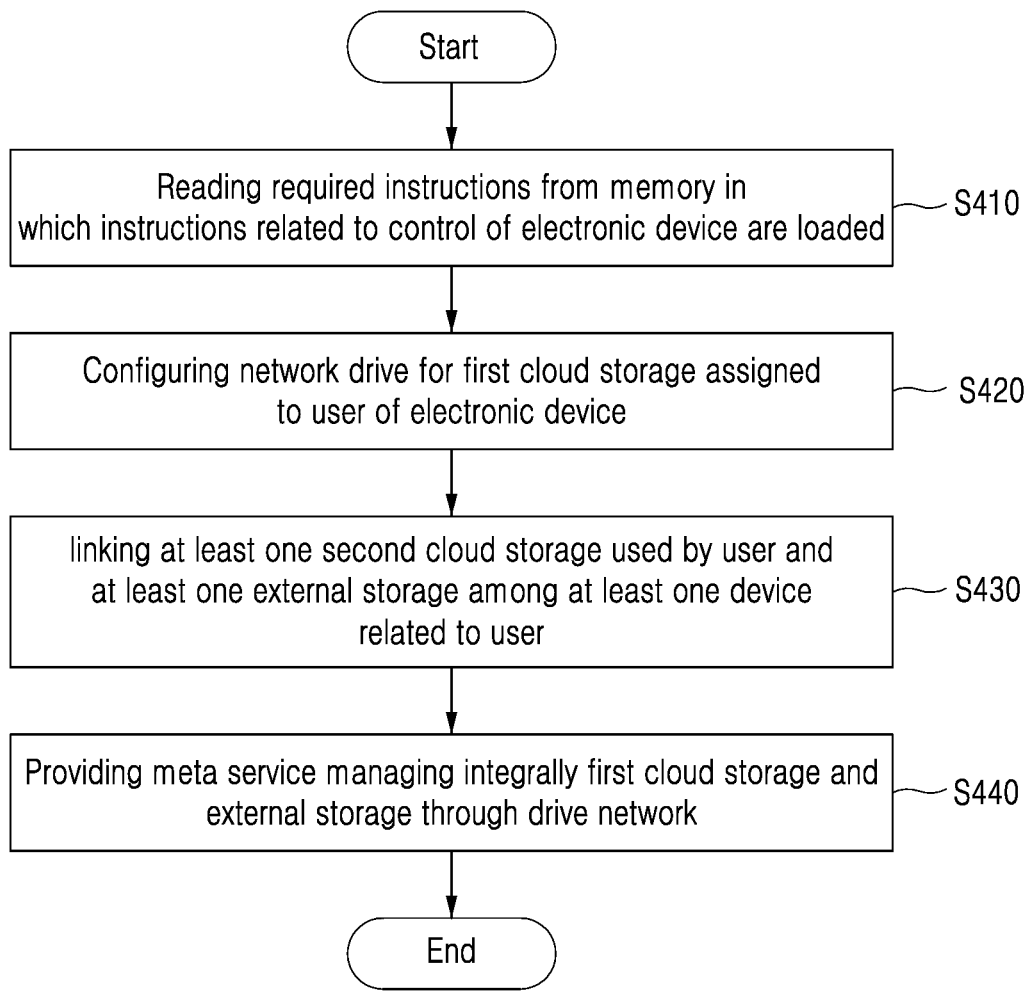
FIG. 4 is a flow chart illustrating an exemplary method for managing cloud storage of an electronic device according to an exemplary embodiment.

FIG. 3 is a block diagram illustrating exemplary components that a processor of an electronic device may include according to an exemplary embodiment, and FIG. 4 is a flow chart illustrating an exemplary method for managing the cloud storage of an electronic device according to an exemplary embodiment.

Here, the first electronic device 110 may include a system for managing the cloud storage implemented by a computer. The system for managing the cloud storage may be implemented in a form of an application installed on the first electronic device 110 and may provide a meta service for the cloud storage in network environment through linking with the server 150.

For example, based on instructions provided by the application installed on the first electronic device 110, the system for managing the cloud storage of the first electronic device 110 may perform a method for managing the cloud storage. To perform the method for managing the cloud storage according to FIG. 4, the processor 212 of the first electronic device 110 may include a drive configuring unit 310, a storage linking unit 320, and a meta service providing unit 330 as described on FIG. 3. According to an exemplary embodiment, the processor 212 may selectively include the components illustrated in FIG. 3. Also, according to an exemplary embodiment, the components of the processor 212 may be formed separated from the processor 212, and the components of the processor 212 may be merged with other components of function of the processor 212.

The processor 212 and the components of the processor 212 may control the first electronic device 110 to perform operations S410, S420, S430, and S440 of the method for managing the cloud storage. For example, the processor 212 and the components of the processor 212 may be implemented to execute instructions using the OS code included in the memory 211 and/or at least one program code.

Here, the components of the processor 212 may represent different functions of the processor 212 performed by the processor 212 according to instructions that the program code stored in the first electronic device 110 provides (e.g. instructions provided by the application driven in the first electronic device 110). For example, the drive configuring unit 310 may be a functional representation of the processor 212 controlling the first electronic device 110 according to the described instructions of first electronic device 110 for configuring the network drive.

According to the exemplary embodiment, in operation S410, the processor 212 may read and load the instructions relevant in controlling the first electronic device 110 from the memory 211. In this case, the loaded instructions may include instructions for controlling the processor 212 to execute the subsequent operations S420, S430, S440 as described hereinafter.

In S420, the drive configuring unit 310 may control the first electronic device 110 to configure a network drive for a first cloud storage assigned to a user of the first electronic device 110. The first cloud storage on the Internet may refer to a cloud storage provided in a cloud service platform related to the server 150. The drive configuring unit 310 may configure a virtual drive (hereinafter, referring to as 'main drive') that may access the first cloud storage assigned to the user of the first electronic device 110 in the cloud service platform related to the server 150 on the first electronic device 110. The above-configured main drive may read content stored in the first cloud storage on the Internet and transmit (or download) the content to the inside of the first electronic device 110 through the network 170, and also upload the content stored in the first electronic device 110 to the first cloud storage.

In operation S430, the storage linking unit 320 may control the first electronic device 110 to link at least one second cloud storage used by the user of the first electronic device 110 with at least one external storage among at least one device related to the user of the first electronic device 110. The storage linking unit 320 may link drive for each of the external storages through the main drive. The second cloud storage is provided from the cloud service platform on a server different from the server 150, and the storage linking unit 320 may link other cloud storages used by the user of the first electronic device 110, i.e. the second cloud storage. The storage linking unit 320 may collect cloud service which may be linked and may provide the collected service list to the user of the first electronic device 110, and accordingly, may link cloud storage selected by the user according to selection and request of the user. Since the cloud service may provide open API (application programming interface) for sharing between services and/or devices, the second cloud storage that the user uses may be connected. Furthermore, the storage linking unit 320 may link the device that the user of the first electronic device 110 uses. For example, the device of the user to be linked may include at least one of a smartphone, a tablet PC, a wearable device, a navigation, a computer, a laptop, a desktop, and the like. The storage linking unit 320 that collects and links other devices that an application for managing the cloud storage may be installed with the account of the user of the first electronic device 110, and it is possible to link a corresponding device by receiving an input of the device information through the first electronic device 110. The storage linking unit 320 may also include the device that the user of the first electronic device 110 uses as another accessible cloud storage through the network 170 and connect the device.

In operation S440, the meta service providing unit 330 may control the first electronic device 110 to provide a meta service which integrally manages the first cloud and the external storage (at least one second cloud storage used by the user of the first electronic device 110 and at least one among at least one device related to the user of the first electronic device 110). As network drive of each of external storages is linked through the main drive, the meta service providing unit 330 may integrally manage other external storages used by the user of the first electronic device 110 with the first cloud storage used by the user of the first electronic device 110. The main drive may access the other cloud storages used by the user of the first electronic device 110 through the open API, and also it is possible to access the file system of other devices used by the user of the first electronic device 110 connected through the network 170. The meta service providing unit 330 may collect meta data of a file stored in the external storage through the main drive, and based on it, and may provide a meta service for the external storage. The meta service providing unit 330 may integrally manage all storages including the first cloud storage used by the user because it is possible to access and edit or generate a file tree of external storage through the main drive, and through the integrated management environment, may provide a file upload function, a file download function, a folder generation function, a folder and file edit function (copy/move/delete/restore/name change, and the like), a folder and file share function, a file viewer function, a folder and file search function, and the like. The meta service providing unit 330 may access the file system of the device used by the user through the main drive, and include the corresponding device in the integrally managed object regarding the device as a form of cloud storage.

Figure 5:
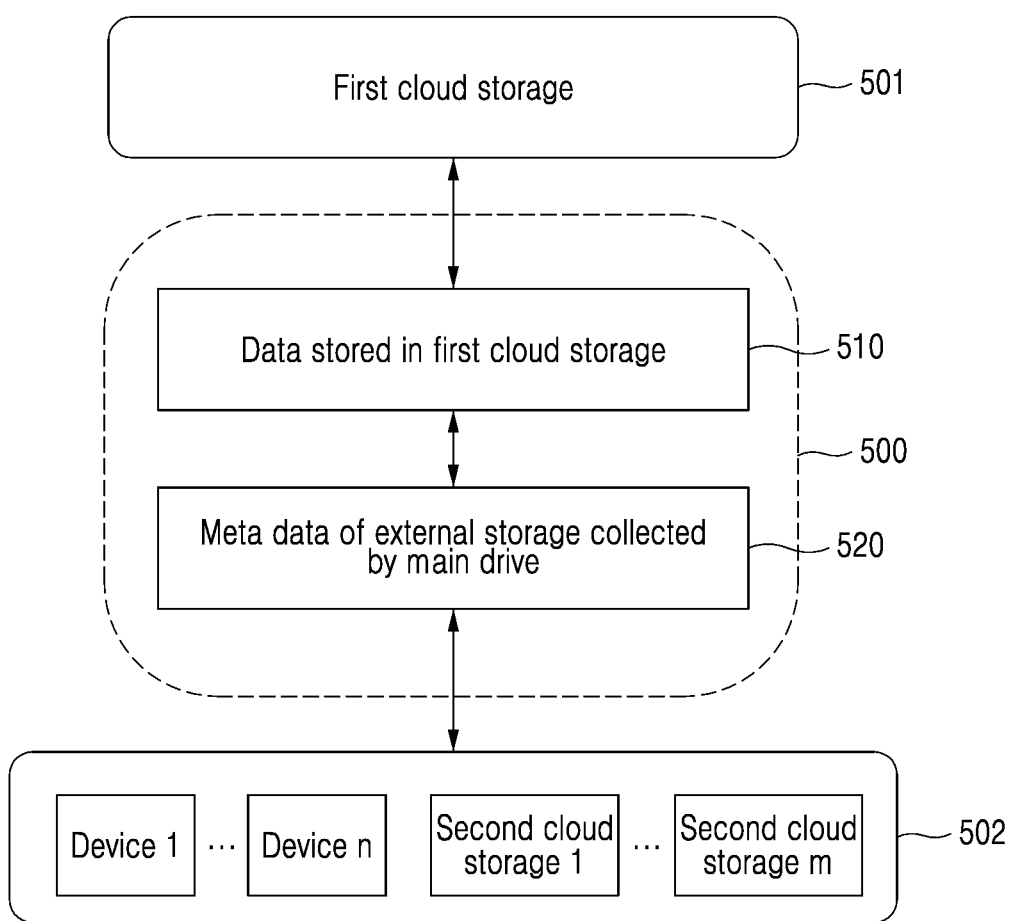
FIG. 5 illustrates an exemplary data configuration of main drive according to an exemplary embodiment.

FIG. 5 illustrates an exemplary data configuration of main drive according to an exemplary embodiment. Referring to FIG. 5, a main drive 500 may include data 510 stored in a first cloud storage 501 on the server 150 and meta data 520 of original data stored in an external storage 502 collected by the main drive 500 for the meta service.

FIGS. 6, 7, 8, 9, 10, 11, and 12 illustrate an exemplary cloud storage management screen displayed on the screen of the first electronic device 110 according to an exemplary embodiment.

Figure 6:
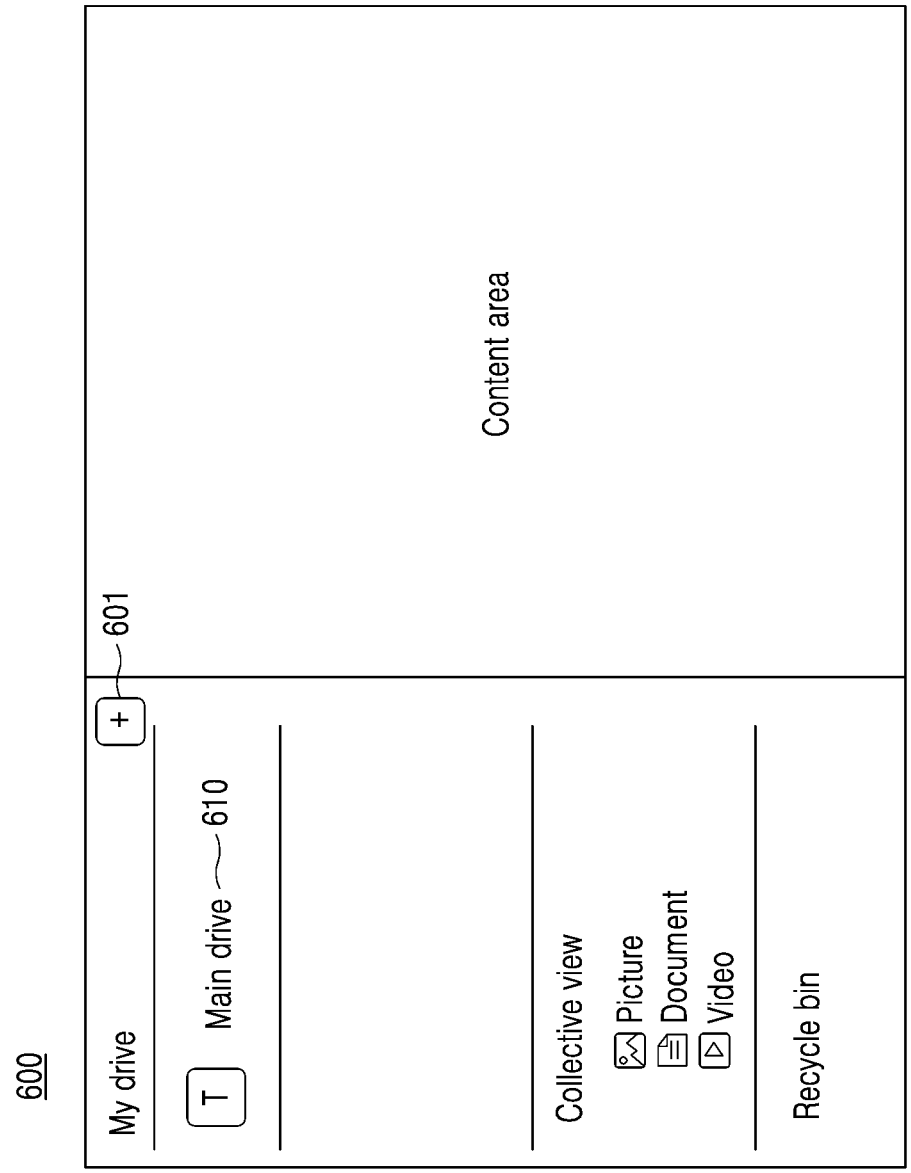

Referring to FIG. 6, the storage management screen 600 may include a 'Main drive' folder 610 for accessing the first cloud storage on the server 150. The storage management screen 600 may include a root folder representing a root directory of a file system for cloud integrated management. For example, 'My drive' may be generated, and the 'Main drive' folder 610 which is a service folder of the first cloud storage provided to the user in the server 150 may be generated in the root folder 'My drive'. For example, when browser based on window application is provided in the first electronic device 110, a root folder for cloud integrated management may be added and displayed in the browser providing a local drive list of the first electronic device 110.

Figure 7:
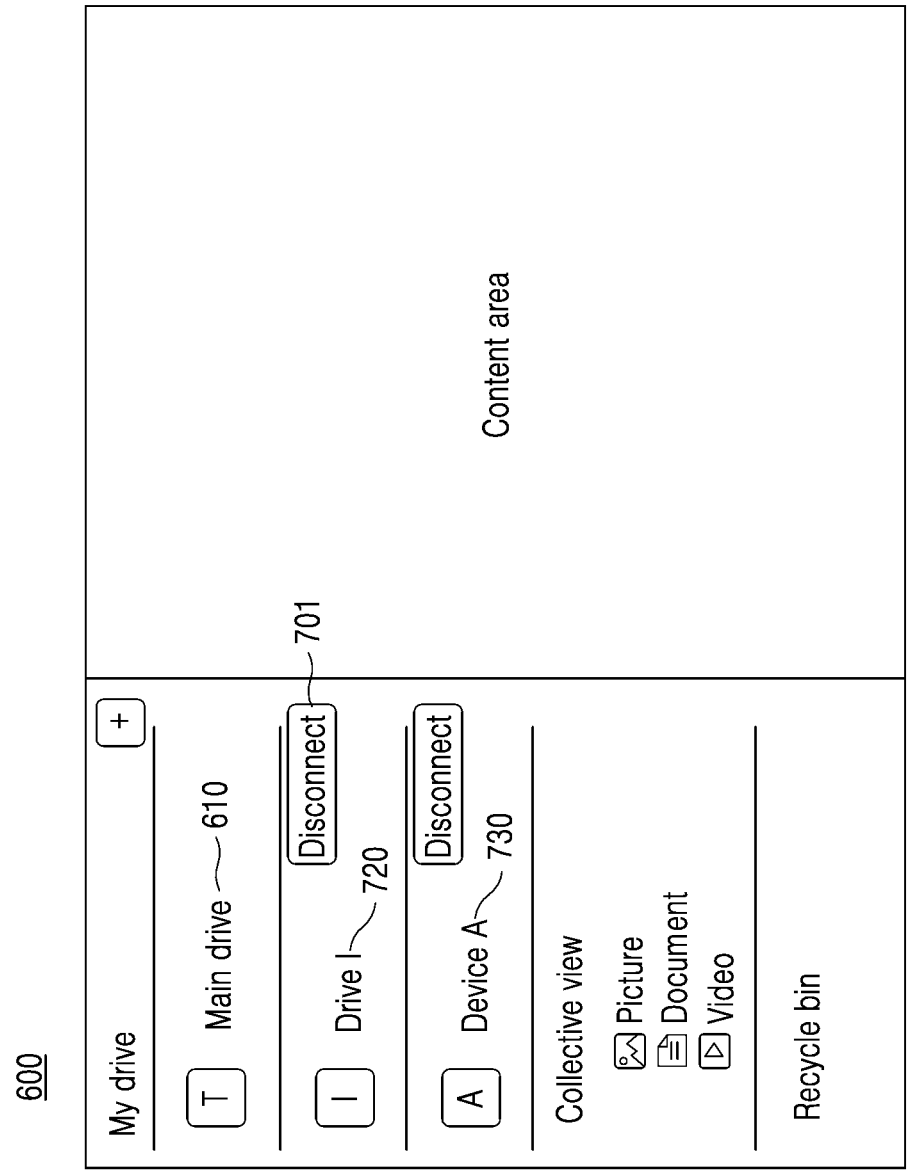

The cloud storage management screen 600 may include a 'Add' UI 601 for adding other external storages that the user tries to link. The cloud storage management screen 600 may display other cloud services and/or devices that the user already uses may be added by using the 'Add' UI 601 besides the cloud service provided in the server 150. A service folder for each of the external storages may be generated in the cloud storage management screen 600 when adding the external storage. For example, when the user adds cloud service 'I' and device 'A', 'Drive I' 720 which represents a service folder of the cloud service 'I' and 'Device A' 730 which represents a service folder of the device 'A' may be generated in the root folder 'My Drive' as illustrated in FIG. 7. The cloud storage management screen 600 may include a 'Disconnect' UI 701 for disconnecting each of service folders 720 and 730 added to the external storage. When the user selects the 'Disconnect' UI 701 to disconnect the selected external storage, the external storage may be removed from the service list in the root folder and all data related to the corresponding storage may be deleted.

Figure 8:
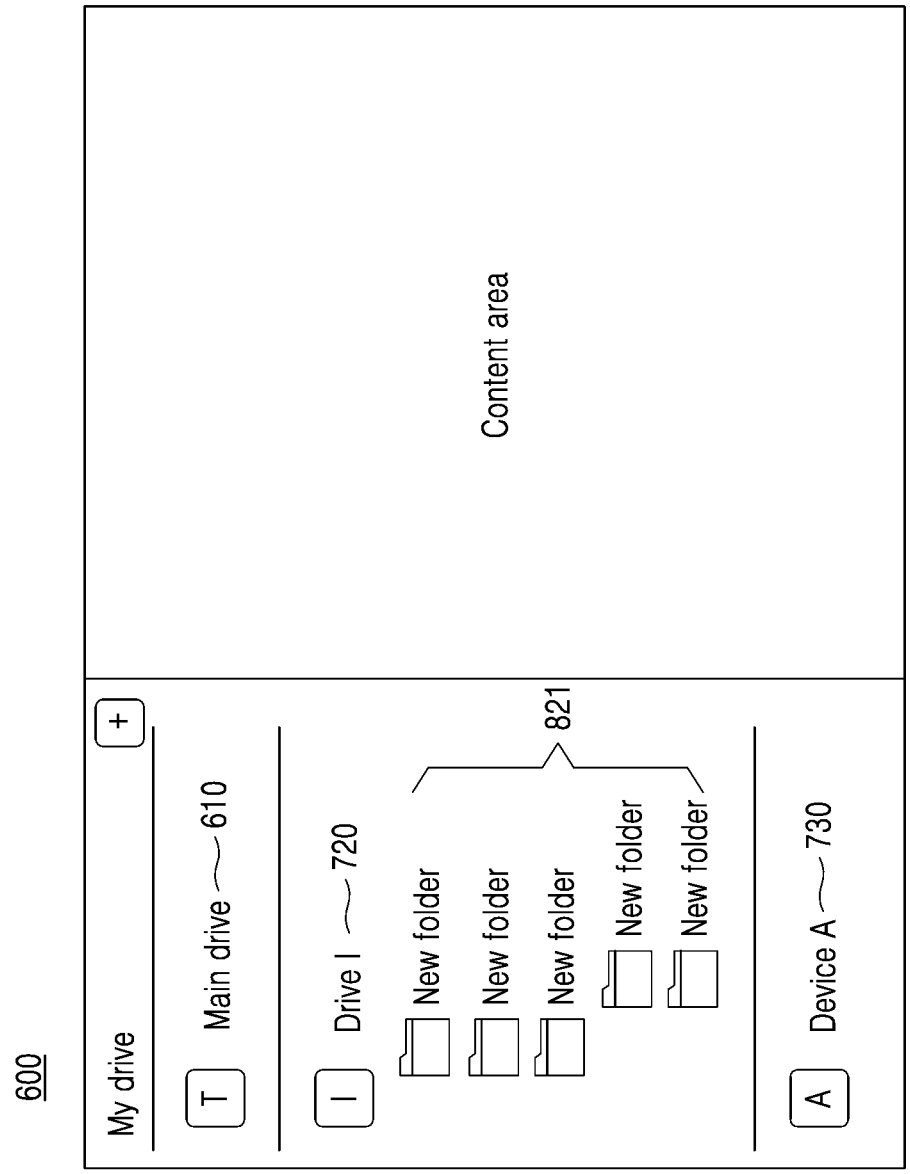

In the cloud storage management screen 600, when the service folder list of the first cloud storage and the added external storage are displayed and specific storage is selected in the service folder list, the folder tree of the corresponding storage may be displayed based on the meta data of the selected storage. Referring to FIGS. 7 and 8, when the service folder 'Drive I' 720 is selected, a folder tree 821 of the cloud service 'I' may be additionally displayed as illustrated in FIG. 8.

A system for managing the cloud storage may provide a function of uploading a file (and/or folder) stored in local disk of the first electronic device 110 to the first cloud storage/the external storage, a function of downloading the file (and/or folder) stored in the first storage/external storage to the local disk of the first electronic device 110, a function of moving the file (and/or folder) between the first cloud and/or the external storage, and the like.

The system for managing the cloud storage may provide a function of copy making a copy of the file (and/or folder) in a selected location between the local disk of the first electronic device 110 and the first cloud storage/the external storage, a function of moving to make a copy of the file (and/or folder) in the selected location and to delete the existing original file (and/or folder).

The system for managing the cloud storage may provide a function of generating a new folder in the service folder of the first cloud storage/the external storage, a delete function to move the selected file (and/or folder) in the local disk of the first electronic device 110 and the first cloud storage/the external storage to a recycle bin, a restore function restoring the deleted file (and/or folder), name change function changing name of the selected file (and/or folder).

Figure 9:
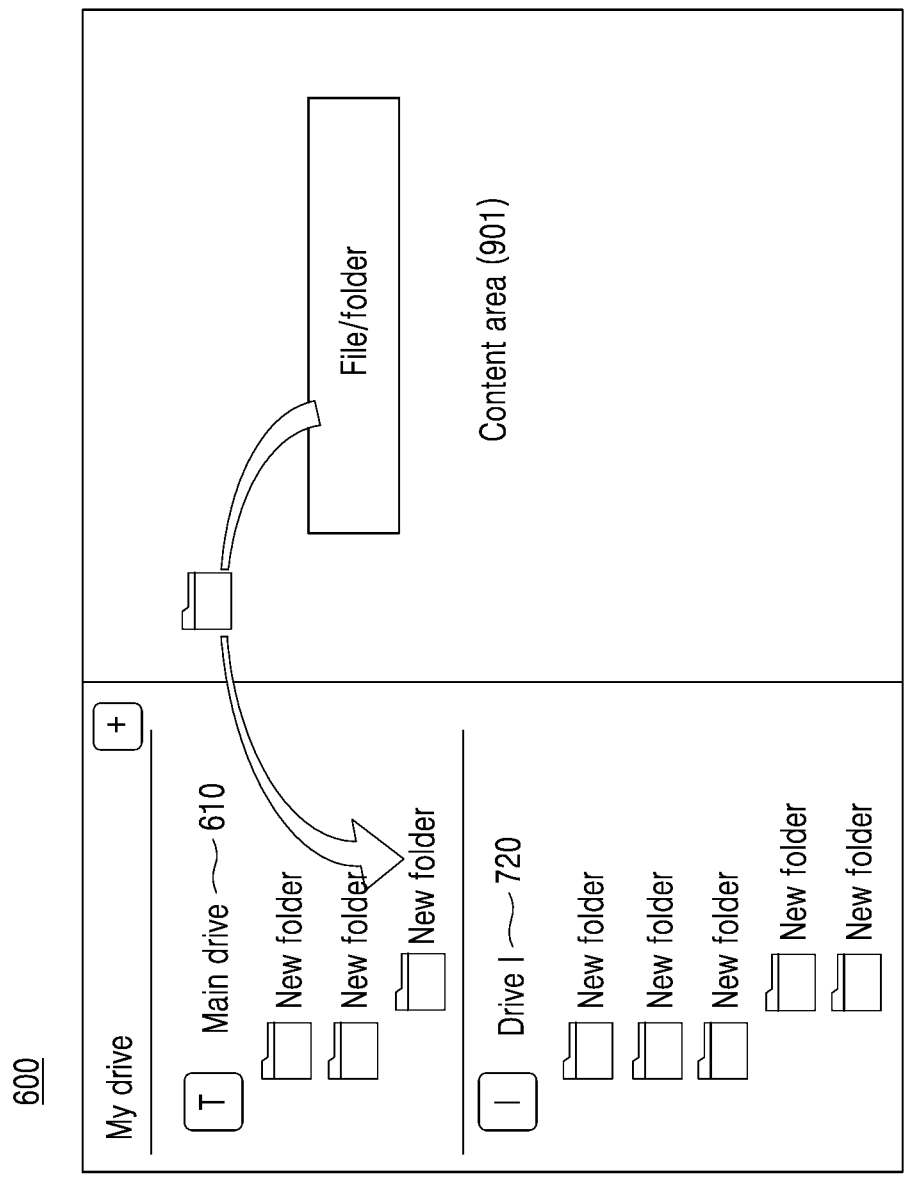
Figure 10:
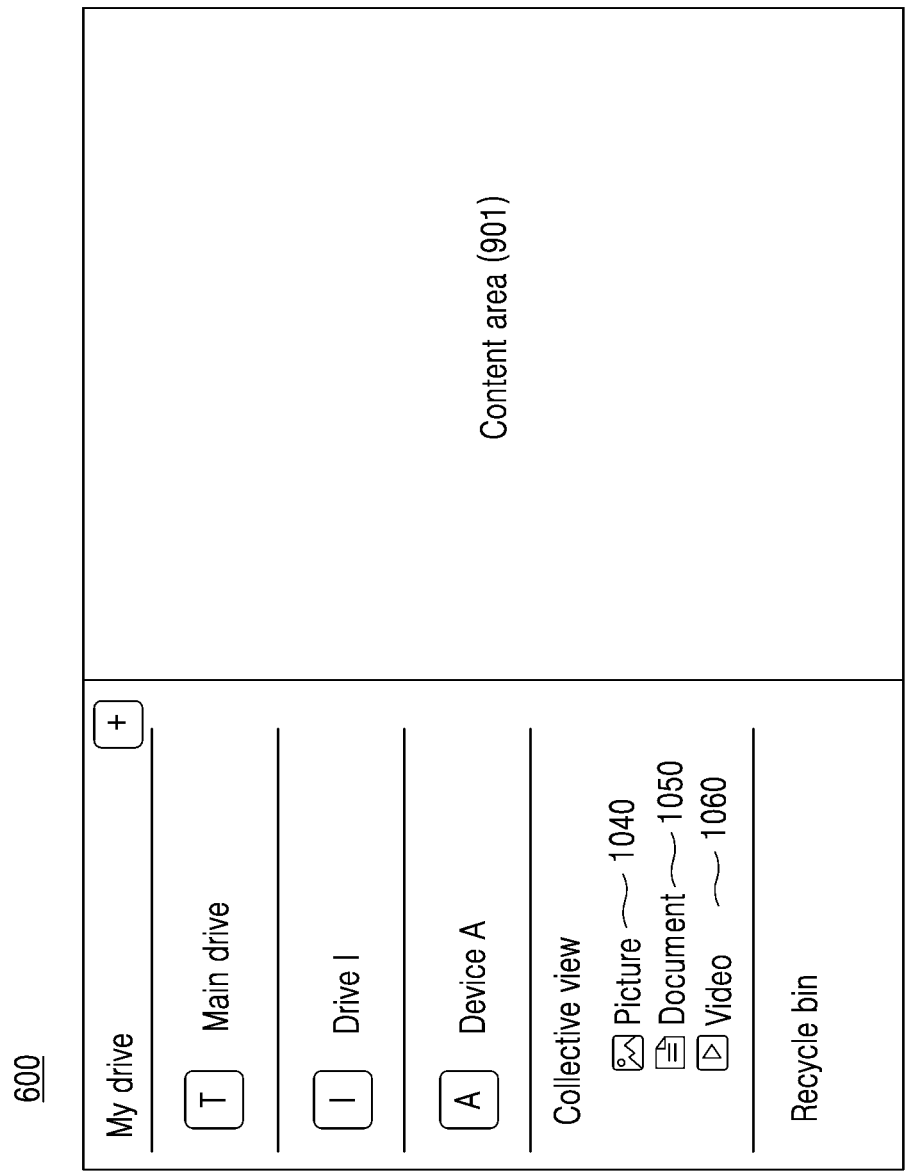

Referring to FIG. 9, the cloud storage management screen 600 may include a content area 901 to display file and folder details stored in the first cloud storage and/or the external storage. In the case of the external storage, a file list may be generated using meta data, not original data, and may be displayed on the content area 901. When some files in the file list displayed on the content area 901 are selected, an edit menu may be displayed. Here, the edit menu may include at least one of download, move, copy, delete, share, go to a corresponding folder, and the like. The selected file and/or folder may be edited such as copy, move, and the like between the storages by using certain gesture (e.g. Drag & Drop and the like) in the content area 901 as described on FIG. 9. When selected file and/or folder is drag-and-dropped into the same storage, the moving function of the selected file and/or folder may be performed, and when selected file and/or folder is drag-and-dropped into the different storage, the copy function of the selected file and/or folder may be performed.

The system for managing the cloud storage may provide a function for generating a link for the selected file (and/or folder) and sharing the link. In other words, when a file (and/or folder) is selected, the system for managing the cloud storage may generate a link, copy the link, and share the copied link. Here, the link may provide a function for downloading the shared file (and/or folder).

The system for managing the cloud storage may provide an integrated search function for searching file name of file (and/or folder) stored in the first cloud storage/the external storage, and here, the system for managing the cloud storage may search for entire storage including the first cloud and the external storage and/or may selectively search the inside of the folder of the storage accessed by the user.

The system for managing the cloud storage may provide a viewer function for the file stored in the first cloud storage/the external storage. According to an example of the viewer function, a collective viewer function may be configured to generate a list by collecting files stored in the first storage/the external storage by file types and displaying the list may be provided. For example, referring to FIG. 10, the cloud storage management screen 600 may include a picture collective viewer function UI 1040 for configuring a picture list by collecting picture type of files in the first cloud storage/the external storage and displaying the list in the content area 901, a document collective viewer UI 1050 for configuring a document list by collecting document type of files in the first cloud storage/the external storage and displaying the list in the content area 901, a video collective viewer UI 1060 for configuring a video list by collecting video type of files in the first cloud storage/the external storage and displaying list in the content area 901, and the like. In the case of the picture, picture preview, slide with next/previous picture, rotating picture, and the like may be provided though the content area 901.

The system for managing the cloud storage may provide a function for classifying and arranging duplicate picture in the case of the picture. For example, the system for managing the cloud storage may group for similar pictures based on the similarity in composition, color, subject, and the like of the pictures. Referring to FIG. 11, a 'Picture Arrangement' UI 1101 for classifying duplicate pictures may be included in the content area 901 in which the picture list is displayed, and when the 'Picture Arrangement' UI 1101 is selected, a classification result 1100 for grouping pictures by the similarity may be provided. The classification result 1100 may provide a function for providing the picture list in a corresponding group by groups and deleting selectively all and/or some part in each of the groups. As another example, the system for managing the cloud storage may classify duplicate pictures through filtering based on meta information and/or tag and the like of the pictures. A 'Picture Arrangement' UI for classifying duplicate pictures may be included in the content area 901 in which the picture list is displayed, and when the 'Picture arrangement' UI is selected, a filter selection screen 1210 for classifying pictures may be firstly provided as described on FIG. 12. For example, date, place, theme, weather, time, and the like may be used as the filter for classifying pictures. When specific filters for classifying pictures are selected through the filter selection screen 1210, a classification result 1200 by filtering based on the selected filter may be provided. The classification result 1200 may provide a picture list corresponding to the selected filter, and may provide a function for deleting all or selectively deleting at least a part of the corresponding list.

Therefore, according to the invention, the system for managing the cloud storage may provide integrated management environment through linking between services without logging in for each of services by adding other cloud services and/or devices that the user already uses through the cloud service basically provided from the server 150 for the user.

Hereinafter, exemplary embodiments of a method for managing files through a chat format UI will be described.

Figure 13:
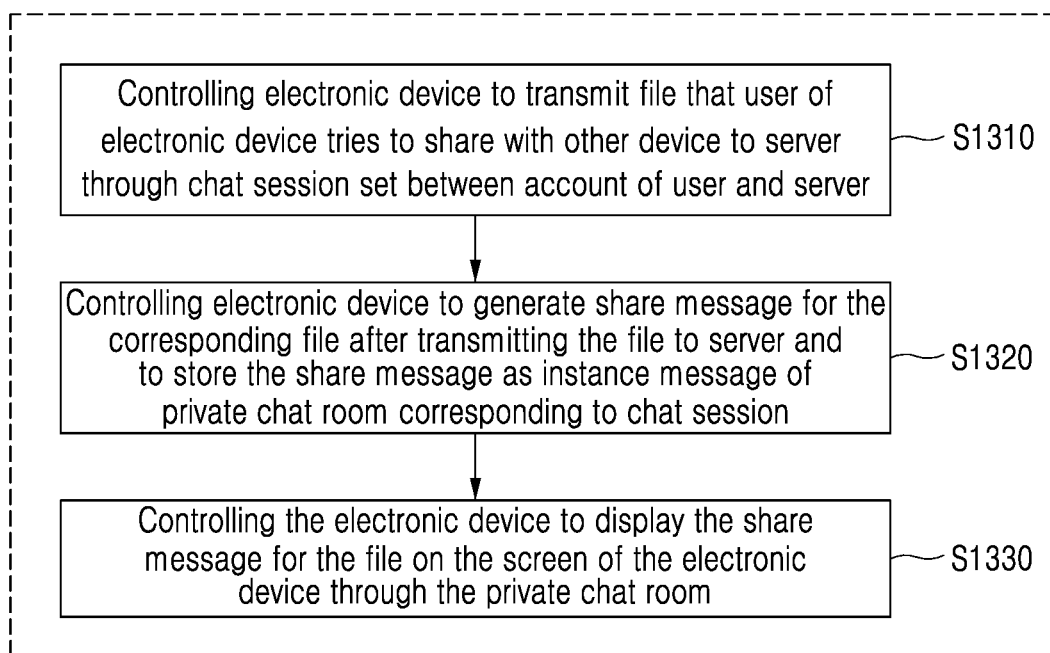
FIG. 13 is a flow chart illustrating an exemplary method for sharing file through a chat session UI of an electronic device, according to an exemplary embodiment.

FIG. 13 is a flow chart illustrating a method for sharing files through the chat session UI according to an exemplary embodiment. The method for sharing files based on chat of FIG. 13 may be performed by the meta service providing unit 330.

In operation S1310, the meta service providing unit 330 may control the first electronic device 110 to transmit a file that the user of the first electronic device 110 tries to share with other devices to the server 150 through a chat session set between an account of the corresponding user and the server 150. Here, the file which is a shared object may include a file and/or folder stored in a local disk of the first electronic device 110, a file and/or folder stored in the first cloud storage and/or the external storage, a file (image and/or picture and the like) on Web screen, a file in the chat content of other messengers, and the like. The user may share file among the devices of the user including the first electronic device 110 and with other devices that use service with the account of the user, according to selection of the user. The meta service providing unit 330 may upload a corresponding file to the server 150 through the chat session set in the account of the user when the user of the first electronic device 110 selects the file to be shared with other devices.

In operation S1320, the meta service providing unit 330 may generate a share message for a corresponding file when the file to be shared is uploaded to the server 150 and may control the first electronic device 110 to store the share message as an instance message of a private chat room corresponding to the chat session set between the account of the user and the server 150. The meta service providing unit 330 may generate a share message as a message including a link of a file storage location of the server 150 for sharing file between devices. The share message transmitted and received through the chat session between the user of the first electronic device 110 and the server 150 may be stored in the first electronic device 110 and the server 150. The share message may be stored as individual chat message, but may be stored in chronological order by including time information. Also, the share message may include information of the device that transmits the file to the server 150, and when the device for sharing file is specified according to selection of the user, the share message may include information of the corresponding device. Furthermore, the share message may include file information for name, size, thumbnail, types (document, image, video, audio, and the like) and the like of file. The share message may be classified by storage times, shared object devices, file types, and the like based on the information included in the message.

In operation S1330, the meta service providing unit 330 may control the first electronic device 110 to display the share message for the file on the screen of the first electronic device 110 through the private chat room corresponding to the chat session set between the account of the user of the first electronic device 110 and the server 150. Here, other devices used by the user may provide receipt notification for the share message transmitted from the first electronic device 110, and may share the file uploaded to the server 150 through the share message in the private chat room by accessing the private chat room with the account of the user.

The share messages for sharing file may be sent and received through messaging service between devices using the service with the account of the user, and the messages may be transmitted and received through the chat session set on the account of the user. The server 150 may provide messaging service for sharing file, and may transmit the share message between devices used by a corresponding user through the chat session set on the account of the user.

When the user of the first electronic device 110 transmits a file to be shared with the first electronic device 110 in the other devices, the meta service providing unit 330 may receive a share message for the file transmitted from the other devices through the chat session set on the account of the user, and may control the first electronic device 110 to provide notification according to receive the share message. The meta service providing unit 330 may display the received share message on the screen of the first electronic device 110 by opening the private chat room when the message receipt notification is selected. The meta service providing unit 330 may display the share messages in time order that the messages are received in the private chat room based on the time information included in the share messages. Also, the meta service providing unit 330 may display the share messages by filtering by devices and/or file types based on the information included in the share messages. Here, the meta service providing unit 330 may download the file stored in the server 150 to the first electronic device 110 through a link included in a corresponding share message when the displayed share message is selected through the private chat room.

FIGS. 14, 15, 16, 17, 18, and 19 illustrates an exemplary private chat room for sharing file displayed on the screen of the first electronic device 110 according to an exemplary embodiment.

Figure 14:
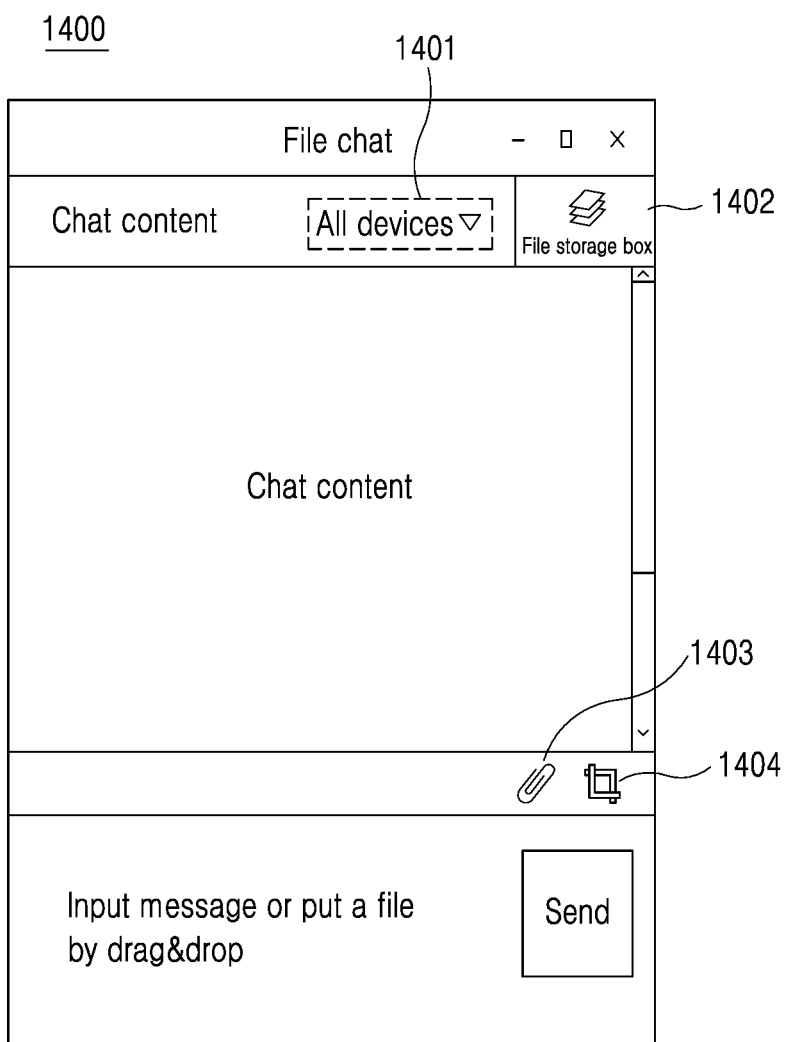

FIG. 14 illustrates an exemplary private chat room 1400 for sharing file. The private chat room 1400 is configured with a screen that chat content sent and received between devices is displayed, and as an example, a list arranging share messages sent and received between devices in time order may be displayed.

The private chat room 1400 may include a device selection UI 1401 for filtering the chat content by devices and confirming the content, a file storage box UI 1402 for switching to a file storage box, a file selection UI 1403 for selecting a file and transmitting the file, a capture UI 1404 for transmitting a file generated by capture, and the like.

The system for managing the cloud storage may provide a list of device connected as the external storage when the device selection UI 1401 is selected in the private chat room 1400, and when specific device is selected in the list, the chat content sent and received with the corresponding device is filtered and displayed on the private chat room 1400.

Figure 15:
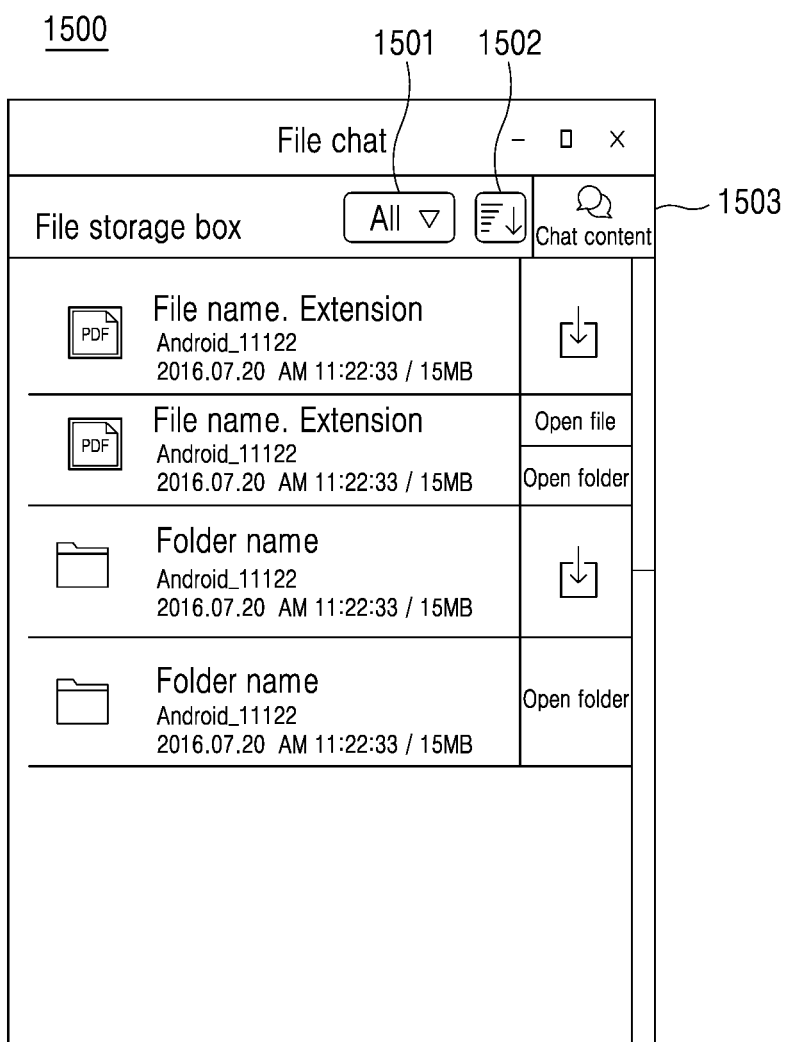
Figure 16:
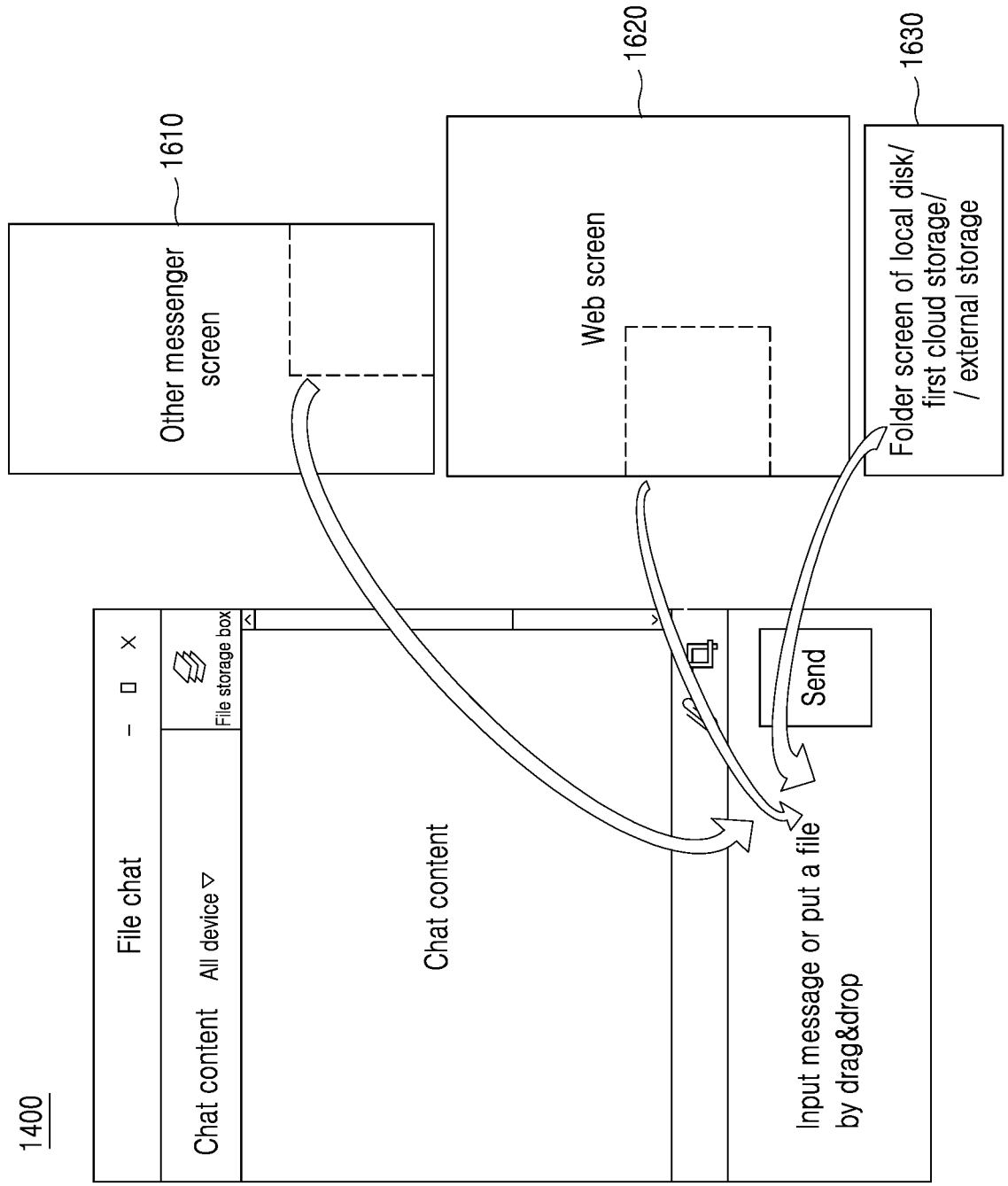
Figure 17:
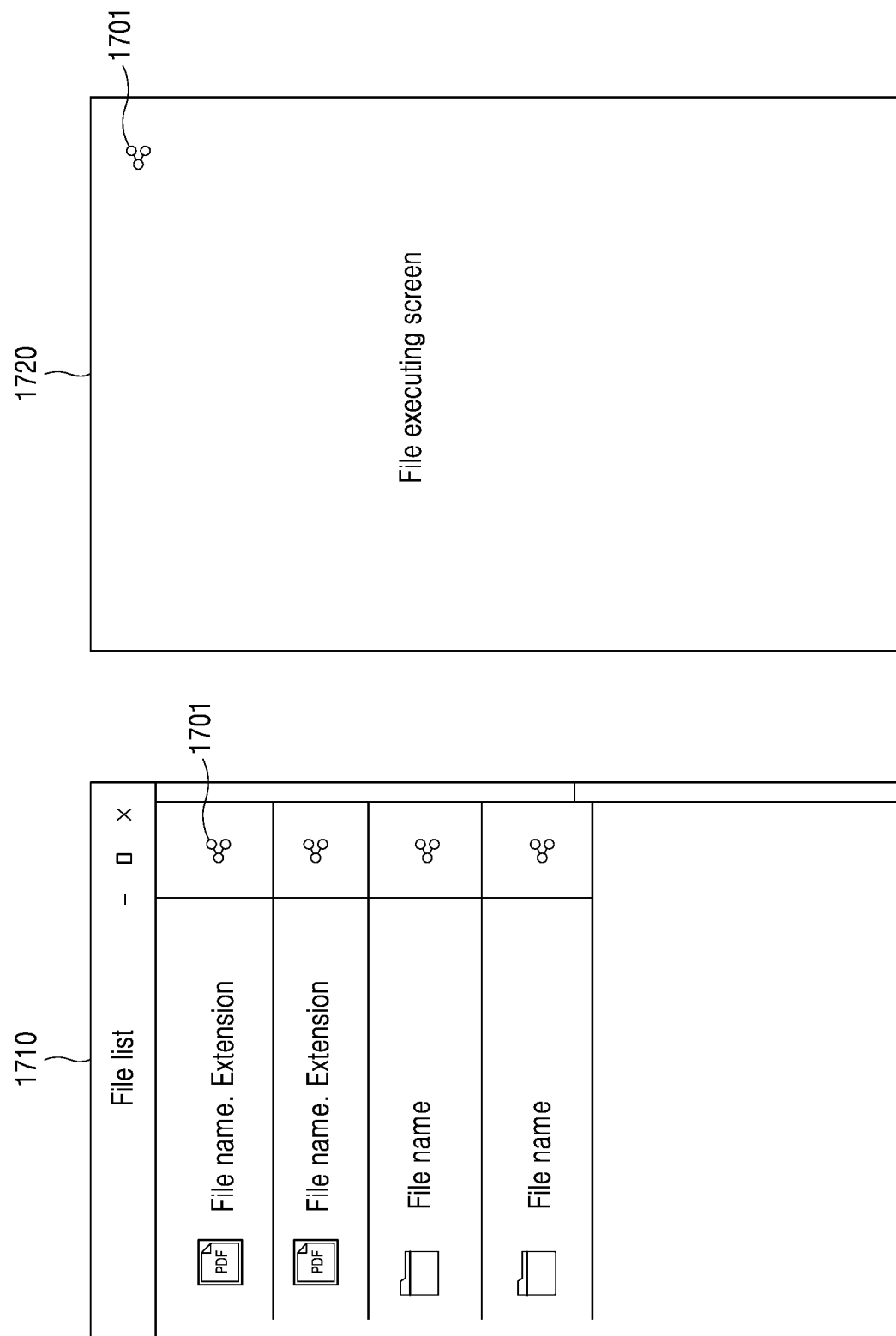

The system for managing the cloud storage may be switched to a file storage box 1500 for managing a list of file transmitted and received between devices through the private chat room 1400 as described on FIG. 15 when the file storage box UI 1402 is selected in the private chat room 1400. The file storage box 1500 which is a screen to confirm all of the files transmitted and received between devices may provide a file list arranged based on a fixed standard.

The file storage box 1500 may include a type selection UI 1501 for filtering a file list by file types (e.g. all, document, image, video, audio, and the like) and confirming the list, an sorting criteria selection UI 1502 for selecting a sorting criteria of the file list (e.g. descending order of modification date, ascending order of modification date, descending order of file name, ascending order of file name, descending order of file size, ascending order of file size, and the like) and confirming the list, a chat content UI 1503 for switching back to the private chat room 1400 of FIG. 14, and the like.

Each of items of the file list displayed on the file storage box 1500 may include file name, file type, file size, transmitting device information, receiving time, and the like, and fixed function buttons may be included in each of file items. For example, in the case of received share message in which file is not downloaded and transmitted share message in which file is not in local disk, a download UI for downloading the file may be included, and in the case of received share message in which file is downloaded and/or transmitted share message in which file is in local disk, a file open UI for executing instantly the file and/or a folder open UI for opening the folder in which there is the corresponding file may be included.

Referring back to FIG. 14, the user of the first electronic device 110 may specify a file to share with other devices and transmit the file by using the file selection UI 1403 and/or the capture UI 1404 in the private chat room 1400. The transmitting file is possible to transmit by attaching the file to the private chat room 1400 in other screens besides using the file selecting UI 1403 and/or the capture UI 1404. For example, referring to FIG. 16, a corresponding file may be transmitted by drag-and-dropping a file (image and/or link and the like) in the chat content to the private chat room 1400 in another messenger screen 1610, by drag-and-dropping a file (image and/or link and the like) in the web page to the private chat room 1400 in a web screen 1620, and by drag-and-dropping a file (and/or folder) to the private chat room 1400 in a folder screen 1630 providing file tree of the local disk/the first cloud storage/the external storage of the first electronic device 110. In addition, referring to FIG. 17, a share UI 1701 is provided in a screen providing a file list 1710, a screen in which file is executed 1720, and the like, and the corresponding file is shared with a device connected with the external storage through the share UI 1701. Here, the share message for the corresponding file may be stored through the private chat room 1400.

Figure 18:
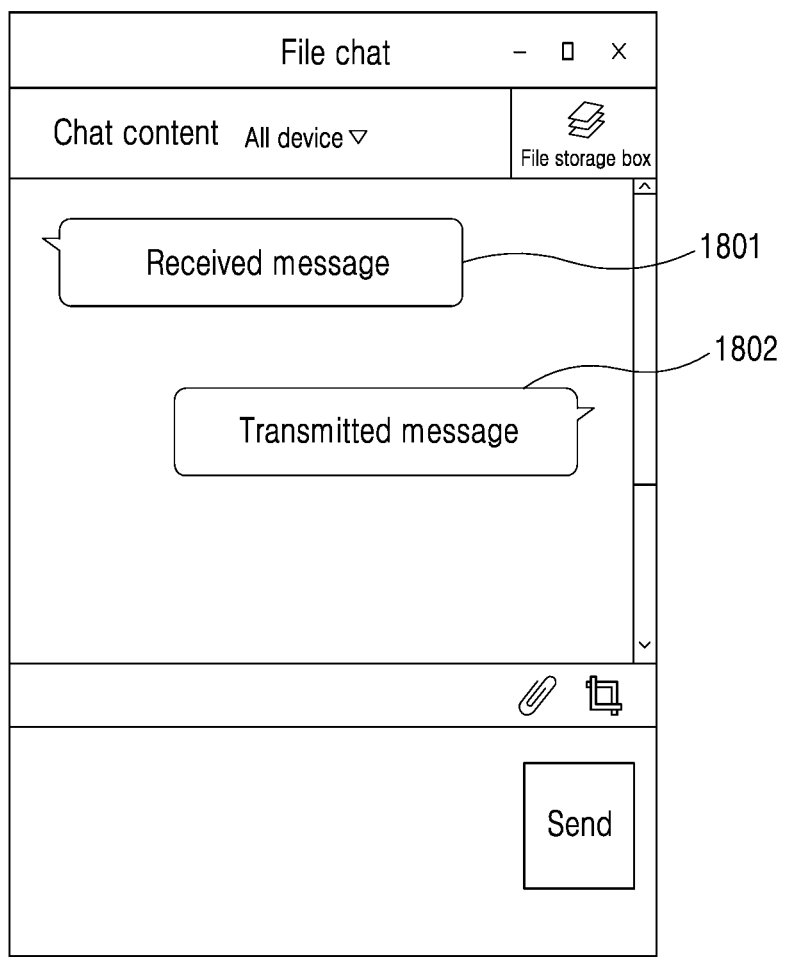

The system for managing the cloud storage may provide the share message for files shared between devices to the user through the private chat room 1400. Referring to FIG. 18, the system for managing the cloud storage may separate a share message 1801 for a file received from other devices and a share message 1802 for a file to be transmitted to other devices and may display the messages on the private chat room 1400. The messages 1801 and 1802 on the private chat room 1400 may be displayed by grouping by dates, and may be displayed with file name, file type, file size, transmitting device information, receiving time, and the like for each of the messages 1801 and 1802. The messages 1801 and 1802 on the private chat room 1400 may include a fixed functional button depending on whether the file is downloaded as providing a link that the file uploaded on the server 150 may be downloaded. For example, as described on FIG. 19, in the case of the received message in which the file is not downloaded and/or the transmitted message in which the file is not in the local disk, a download UI 1910 for downloading the file may be included, and in the case of the received message in which the file is downloaded and the transmitted message in which the file is in the local disk, an open UI 1920 to execute immediately the file may be included. Also, the messages 1801 and 1802 on the private chat room 1400 may be displayed as a form including an image thumbnail when the file type to share is an image and/or a video.

Therefore, according to the invention, the system for managing the cloud storage may easily share a file between devices used by the user by using the private chat room and may shorten file access path by directly downloading and/or executing the file in the private chat room without searching every storage path of the shared file. If the user uploads a file which is edited and/or used to the private chat room through a specific device, the user may easily and quickly access the corresponding file at anytime by opening the private chat room when the user tries to access the corresponding file by using other devices later on.

The units described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The exemplary embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present disclosure, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

According to exemplary embodiments, a meta service may be provided for integrally managing a plurality of cloud storages.

According to exemplary embodiments, a device that a user uses may be regarded as storage and may be managed integrally with cloud storage.

According to exemplary embodiments, file accessibility may be improved by supporting file sharing between devices through a chat type of UI.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method for sharing file of a first electronic device used by a user using a share message implemented by a computer, the method comprising:

uploading a file to be shared with a second electronic device used by the user to a server according to the share message transmitted through a chat session set between an account of the user of the first electronic device and the server providing a cloud service;

storing the share message comprising a link of a storage location of the server for the file uploaded to the server as an instance message of a private chat room corresponding to the chat session; and displaying the share message stored as the instance message through the private chat room on a screen of the first electronic device, wherein the second electronic device is configured to access the private chat room with the account of the user and the file uploaded on the server shared with the second electronic device through the share message displayed in the private chat room accessed by the account of the user, and wherein the displaying the share message comprises:
displaying a share message by filtering by device through the private chat room accessed by the account of the user such that the share message from the first electronic device is distinguished from another share message from another device in the private chat room transmitted between multiple users.

2. The method of claim 1, wherein the second electronic device is configured to download the file from the server through the link comprised in the share message.

3. The method of claim 1 further comprising: providing receipt notification of a share message for a corresponding file on a screen for the second electronic device in response to the first electronic device uploading the file to be shared with the second electronic device to the server.

4. The method of claim 1, wherein the storing the share message comprises:
storing a share message as a separate chat message for each file uploaded to the server.

5. The method of claim 1, wherein the storing the share message comprises:
storing a share message comprising type information of a corresponding file for each file uploaded to the server.

6. The method of claim 1, wherein the storing the share message comprises:
storing a share message comprising information for a corresponding device in response to specifying the second electronic device to which the file is shared.

7. The method of claim 1, wherein the displaying the share message comprises:
providing a user interface (UI) displayed through the private chat room for downloading a file that is not downloaded; and
providing a UI displayed through the private chat room for opening a file that is downloaded.

8. The method of claim 1 further comprising:
providing a file storage box for managing a file list shared between the first electronic device and the second electronic device through the private chat room.

9. The method of claim 8, wherein the providing a file storage box comprises:
displaying the file list by filtering by file type.

10. The method of claim 8, wherein the providing a file storage box comprises:
providing a user interface (UI) for downloading a file in the file list that is not downloaded; and
providing a UI for opening a file that is downloaded.

11. A non-transitory computer-readable medium storing a set of instructions that, when executed by a processor, causes the processor to perform a method for sharing a file of a first electronic device used by a user using a share message combined with a system for sharing the file implemented by a computer, the method comprising:

uploading a file to be shared with a second electronic device used by the user to a server according to the share message transmitted through a chat session set between an account of the user of the first electronic device and the server providing a cloud service;

storing the share message comprising a link of a storage location of the server for the file uploaded to the server as an instance message of a private chat room corresponding to the chat session; and displaying the share message stored as the instance message on a screen of the first electronic device through the private chat room, wherein the second electronic device is configured to access the private chat room with the account of the user and the file uploaded to the server shared with the second electronic device through the share message displayed in the private chat room accessed by the account of the user, and wherein the displaying the share message comprises: displaying a share message by filtering by device through the private chat room accessed by the account of the user such that the share message from the first electronic device is distinguished from another share message from another device in the private chat room transmitted between multiple users.

12. A system for sharing file of a first electronic device used by a user using a share message implemented by a computer, the system comprising at least one processor implemented to execute computer-readable instructions, wherein the at least one processor is configured to:
upload the file to be shared with a second electronic device used by the user to a server according to the share message transmitted through a chat session set between an account of the user of the first electronic device and the server providing a cloud service;
store the share message comprising a link of a storage location of the server for the file uploaded to the server as an instance message of a private chat room corresponding to the chat session; and
display the share message stored as the instance message on a screen of the first electronic device by filtering by device through the private chat room accessed by the account of the user such that the share message from the first electronic device is distinguished from another share message from another device in the private chat room transmitted between multiple users.

13. The system of claim 12, wherein the second electronic device is configured to:
access the private chat room with the account of the user;
share the file uploaded to the server through the share message displayed on the private chat room, and
download the file from the server through the link comprised in the share message.

14. The system of claim 12, wherein the at least one processor is configured to provide receipt notification of a share message for a corresponding file on a screen for the second electronic device in response to the first electronic device uploading the file to be shared with the second electronic device to the server.

15. The system of claim 12, wherein the at least one processor is configured to:
store a share message as a separate chat message for each file uploaded on the server; and
store the share message by comprising type information of the corresponding file.

16. The system of claim 12, wherein the at least one processor is configured to:
store a share message as a separate chat message for each file uploaded on the server; and
store the share message by comprising information for a corresponding device in response to specifying the second electronic device to which share file is shared.

17. The system of claim 12, wherein the at least one processor is configured to:
provide a user interface (UI) displayed through the private chat room for downloading a file that is not downloaded for each share message; and
provide a UI displayed through the private chat room for opening a file that is downloaded for each share message.

18. The system of claim 12, wherein the at least one processor is configured to:
provide a file storage box for managing a file list shared between the first electronic device and the second electronic device through the private chat room.

19. The system of claim 18, wherein the at least one processor is configured to:
provide a user interface (UI) for downloading a file that is not downloaded in the file list; and
provide a UI for opening a file that is downloaded.

* * * * *